United States Patent
Chen et al.

(10) Patent No.: US 12,179,814 B2
(45) Date of Patent: Dec. 31, 2024

(54) SUBWAY TUNNEL INTELLIGENT MONITORING METHOD AND SYSTEM

(71) Applicant: Shenzhen University, Guangdong (CN)

(72) Inventors: Xiangsheng Chen, Guangdong (CN); Xiaohua Bao, Guangdong (CN); Hongzhi Cui, Guangdong (CN); Jun Shen, Guangdong (CN)

(73) Assignee: Shenzhen University, Guangdong (CN)

( * ) Notice: Subject to any disclaimer, the term of this patent is extended or adjusted under 35 U.S.C. 154(b) by 0 days.

(21) Appl. No.: 18/763,145

(22) Filed: Jul. 3, 2024

(65) Prior Publication Data
US 2024/0351623 A1    Oct. 24, 2024

Related U.S. Application Data

(63) Continuation of application No. PCT/CN2023/139472, filed on Dec. 18, 2023.

(30) Foreign Application Priority Data

Feb. 15, 2023 (CN) .......................... 202310113646.X

(51) Int. Cl.
*G08B 25/00* (2006.01)
*B61L 23/04* (2006.01)
*E21F 17/18* (2006.01)

(52) U.S. Cl.
CPC ............ *B61L 23/041* (2013.01); *E21F 17/18* (2013.01)

(58) Field of Classification Search
USPC ... 340/541, 543, 545.3, 545.6, 545.8, 568.1, 340/568.8, 636.19, 680, 686.1, 3.9
See application file for complete search history.

(56) References Cited

U.S. PATENT DOCUMENTS

| | | | |
|---|---|---|---|
| 5,950,543 A | * | 9/1999 | Oster ................. B61B 13/10 104/130.05 |
| 2017/0227470 A1 | * | 8/2017 | Cesarano ............ G05D 1/104 |
| 2020/0167631 A1 | * | 5/2020 | Rezgui ................ B25J 9/0084 |

(Continued)

FOREIGN PATENT DOCUMENTS

| | | |
|---|---|---|
| CN | 104787084 A | 7/2015 |
| CN | 106251347 A | 12/2016 |
| CN | 107144887 A | 9/2017 |

(Continued)

OTHER PUBLICATIONS

First Office Action cited in corresponding Chinese patent application No. 202310113646.X, dated Apr. 8, 2023, 13 pages.

*Primary Examiner* — Daniel Previl
(74) *Attorney, Agent, or Firm* — Cooper Legal Group, LLC

(57) ABSTRACT

Subway tunnel intelligent monitoring method and system relate to the field of track detection. The method includes: activating the inspection device to inspect the track section and detect foreign objects; when the inspection device detects the foreign object during foreign object detection, identifying and acquiring a volume of the foreign object, and according to a correspondence between a range interval to which the volume of the foreign object belongs and a processing scheme, determining the processing scheme for the foreign object with the corresponding volume; implementing the processing scheme for the foreign object with the corresponding volume.

9 Claims, 10 Drawing Sheets

(56) References Cited

U.S. PATENT DOCUMENTS

| | | | |
|---|---|---|---|
| 2021/0223363 A1* | 7/2021 | Orellana | G06V 20/58 |
| 2022/0005332 A1* | 1/2022 | Metzler | G06F 18/2431 |

FOREIGN PATENT DOCUMENTS

| | | |
|---|---|---|
| CN | 108214554 A | 6/2018 |
| CN | 108657223 A | 10/2018 |
| CN | 109146971 A | 1/2019 |
| CN | 109164443 A | 1/2019 |
| CN | 109688388 A | 4/2019 |
| CN | 211202034 U | 8/2020 |
| CN | 111626204 A | 9/2020 |
| CN | 113858231 A | 12/2021 |
| CN | 114494983 A | 5/2022 |
| CN | 114529811 A | 5/2022 |
| CN | 114814877 A | 7/2022 |
| CN | 115311354 A | 11/2022 |
| CN | 115600124 A | 1/2023 |
| CN | 115686014 A | 2/2023 |
| CN | 115690705 A | 2/2023 |
| CN | 115892131 A | 4/2023 |
| JP | 2011192110 A | 9/2011 |
| JP | 2020060419 A | 4/2020 |
| KR | 102277633 B1 | 7/2021 |

* cited by examiner

SUBWAY TUNNEL INTELLIGENT MONITORING METHOD AND SYSTEM

CROSS-REFERENCE TO RELATED APPLICATION

This application is a continuation of PCT application serial no. PCT/CN2023/139472, filed on Dec. 18, 2023, which claims priority and benefit of Chinese patent application serial no. 202310113646.X, filed on Feb. 15, 2023. The entireties of PCT application serial no. PCT/CN2023/139472 and Chinese patent application serial no. 202310113646.X are hereby incorporated by reference herein and made a part of this specification.

TECHNICAL FIELD

The disclosure relates to the field of track detection, and particularly to a subway tunnel intelligent monitoring method and system.

BACKGROUND ART

Track sections include tunnel sections and open-air sections. In platforms of the tunnel sections, due to the gap between the subway vehicle and the platform, when passengers enter and exit the subway vehicle, objects occasionally fall into the track sections. In the open-air sections, uncontrollable factors increase, and foreign objects occasionally fall into the track sections. The subway track sections are the main place for operation of subway vehicles. The main prerequisite for safe subway operation is to ensure that there are no foreign objects within the construction boundary of the track sections.

At present, track inspection is mainly done manually. When the subway stops operating, track maintenance technicians determine whether there are foreign objects in the track with the naked eyes by means of lighting equipment. In recent years, some subway corporations have begun to try to use inspection devices such as track inspection vehicles to inspect tunnels, but currently most of the track inspection vehicles are still mainly used to detect track damage, gauge deviation, and tunnel deformation.

With respect to the above-mentioned related technologies, the inventors found the following defects: on the one hand, the inspection devices such as track inspection vehicles mainly detect track damage, track gauge deviation, and tunnel deformation during the inspection process, and are unable to analyze foreign objects on the track; on the other hand, track maintenance technicians use the naked eye to judge whether there are foreign objects in the track, which consumes manpower and material resources, has low detection efficiency, may lead to missed inspection, and is easy to cause safety hazards.

SUMMARY

In order to make full use of the inspection device to identify, detect and treat foreign objects in passing during the inspection operation to minimize the presence of foreign objects in the tracks, the disclosure provides a subway tunnel intelligent monitoring method and system.

In a first aspect, the disclosure provides a subway tunnel intelligent monitoring method
including:
acquiring an inspection time plan of an inspection device;
activating the inspection device to inspect a track section and detect a foreign object according to the inspection time plan of the inspection device;
when the inspection device detects the foreign object during foreign object detection, identifying and acquiring a volume of the foreign object, and according to a correspondence between a range interval to which the volume of the foreign object belongs and a processing scheme, determining the processing scheme for the foreign object with the corresponding volume;
implementing the processing scheme for the foreign object with the corresponding volume.

According to the above steps, the inspection device can be fully utilized to detect foreign objects during the inspection according to the inspection time plan, and targeted processing schemes are provided for foreign objects of different volumes, so as to minimize the foreign objects present in the track and reduce safety hazards.

Optionally, activating the inspection device to inspect a track section and detect a foreign object includes:
acquiring a wind power information of the track section where the inspection device is located and a track section category, and defining the track section category into a tunnel section and an open-air section;
according to a correspondence between the wind power information of the track section, the track section category and a distribution probability of foreign object in distribution area, determining the distribution probability of foreign object in the distribution area of the track section where the inspection device is located, and driving the inspection device to detect the foreign object in the distribution area sequentially in an order of foreign object distribution probability from high to low.

According to the above steps, it is fully considered that there are differences in foreign objects of different track section categories and differences in wind power, so the distribution of foreign objects is also different. Full consideration is given to the wind power information of the track section where the inspection device is located and the track section category to more accurately determine the distribution probability of foreign object in distribution area, so that the inspection device can detect foreign object more promptly during the inspection process, and the efficiency of treating foreign objects and safety hazards is indirectly improved.

Optionally, according to the correspondence between the wind power information of the track section, the track section category and the distribution probability of foreign object in distribution area, determining the distribution probability of foreign object in the distribution area of the track section where the inspection device is located includes:
according to the correspondence between the wind power information of the track section, the track section category and the distribution probability of foreign object in distribution area, querying the distribution probability of foreign object in distribution area corresponding to the wind power information of the track section where the inspection device is located and the track section category;
if a result is found, using the queried distribution probability of foreign object in distribution area as a determined distribution probability of foreign object in the distribution area of the track section where the inspection device is located;
if no results are found, according to the correspondence between the wind power information of the track section, the track section category and the distribution probability of foreign object in distribution area, querying and acquiring a distribution probability of foreign object in distribution area corresponding to three wind power information with a same wind direction corresponding to the current track section category and the current wind power information and closest to a wind power intensity corresponding to the current wind power information;

according to the queried and acquired distribution probability of foreign object in distribution area corresponding to three wind power information with a same wind direction corresponding to the current track section category and the current wind power information and closest to a wind power intensity corresponding to the current wind power information, calculating an average distribution probability of foreign object in distribution area as the determined distribution probability of foreign object in the distribution area of the track section where the inspection device is located.

According to the above steps, it is fully considered that when the distribution probability of foreign object in distribution area cannot be determined by the correspondence between the wind information of the track section, the track section category where the inspection device is located and the distribution probability of the foreign object category, the distribution probability of foreign object in distribution area can be determined indirectly by effectively referring to the distribution probability of foreign object in distribution area corresponding to three wind power information with the same current track section category and closest to the wind power intensity corresponding to the current wind power information.

Optionally, driving the inspection device to detect the foreign object in the distribution area sequentially in an order of foreign object distribution probability from high to low includes:

determining whether there are distribution areas with a same distribution probability of foreign object;

if yes, according to a correspondence between a distribution area and a distribution probability of foreign object type, and a correspondence between the foreign object type and a risk level, calculating a product of the distribution probability of each foreign object type and the risk level of the corresponding foreign object type, and acquiring the overall risk level of the distribution area with the same distribution probability of foreign object by accumulating the products of the foreign object types;

sequencing the distribution areas with the same distribution probability of foreign object according to the overall risk level from high to low, and driving the inspection device to detect the foreign object in the distribution area sequentially in an order of foreign object distribution probability from high to low;

if no, driving the inspection device to detect the foreign object in the distribution area sequentially in an order of foreign object distribution probability from high to low.

According to the above steps, it is further considered that when there are distribution areas with the same distribution probability of foreign object, the correspondence between the distribution area and the distribution probability of the foreign object type, and the correspondence between the foreign object type and the risk level can be overall considered to effectively analyze and determine the overall risk level of the distribution area, and reorder the distribution areas according to the overall risk level, so that the inspection device gives priority to processing the distribution areas with higher risk levels, so as to indirectly improve the efficiency of discovering safety hazards and reduce the probability of safety hazards occurring.

Optionally, according to the correspondence between the wind power information of the track section, the track section category and the distribution probability of foreign object in distribution area, determining the distribution probability of foreign object in the distribution area of the track section where the inspection device is located includes:

determining whether a dedicated foreign object detection device distributed in the track section where the inspection device is located detects that the foreign object has fallen in the corresponding track section;

if yes, using the distribution probability of the distribution area where the foreign object falls detected by the dedicated foreign object detection device as the determined distribution probability of foreign object in distribution area;

if no, according to the correspondence between the wind power information of the track section, the track section category and the distribution probability of foreign object in distribution area, determining the distribution probability of foreign object in the distribution area of the track section where the inspection device is located.

According to the above steps, full consideration is given to whether a dedicated foreign object detection device is provided in the track section. On the basis of existing the dedicated foreign object detection device, the distribution probability of foreign object in distribution area will be mainly determined by the distribution probability of the distribution area where the dedicated foreign object detection device detects that foreign objects fall.

Optionally, a further step that determining whether a dedicated foreign object detection device distributed in the track section where the inspection device is located detects that the foreign object has fallen in the corresponding track section is included, specifically as follows:

activating the dedicated foreign object detection device for on-site inspection of subway tunnel, wherein the inspection content comprises block falling, water seepage, and abnormal status of basic equipment and facilities in the tunnel.

According to the above steps, it is fully considered that in the process of using the dedicated foreign object detection device, other completable detections can also be completed at the same time, so as to improve the overall detection efficiency.

Optionally, if no, according to the correspondence between the wind power information of the track section, the track section category and the distribution probability of foreign object in distribution area, determining the distribution probability of foreign object in the distribution area of the track section where the inspection device is located includes:

according to the correspondence between the wind power information of the track section, the track section category and a probability that the dedicated foreign object detection device detects the foreign object, determining the probability that the dedicated foreign object detection device detects the foreign object corresponding to the current wind power information of the track section and the track section category;

if the probability that the dedicated foreign object detection device detects the foreign object is greater than a preset probability, determining whether a dedicated foreign object detection device distributed in the track section where the inspection device is located detects that the foreign object has fallen in the corresponding track section;

if yes, using the distribution probability of the distribution area where the foreign object falls detected by the dedicated foreign object detection device as the determined distribution probability of foreign object in distribution area;

if no, according to the correspondence between the wind power information of the track section, the track section category and the distribution probability of foreign object in distribution area, querying the distribution probability of foreign object in distribution area;

if the probability that the preset dedicated foreign object detection device detects the foreign object is less than or equal to the preset probability, according to the correspondence between the wind power information of the track section, the track section category and the distribution probability of foreign object in distribution area, querying the distribution probability of foreign object in distribution area;

if a result is found, using the queried distribution probability of foreign object in distribution area as a determined distribution probability of foreign object in the distribution area of the track section where the inspection device is located;

if no results are found, according to the correspondence between the wind power information of the track section, the track section category and the distribution probability of foreign object in distribution area, querying and acquiring a distribution probability of foreign object in distribution area corresponding to three wind power information with a same wind direction corresponding to the current track section category and the current wind power information and closest to a wind power intensity corresponding to the current wind power information;

according to the queried and acquired distribution probability of foreign object in distribution area corresponding to three wind power information with a same wind direction corresponding to the current track section category and the current wind power information and closest to a wind power intensity corresponding to the current wind power information, calculating an average distribution probability of foreign object in distribution area as the determined distribution probability of foreign object in the distribution area of the track section where the inspection device is located.

According to the above steps, it is fully considered that the probability that the dedicated foreign object detection device detects the foreign object will also be affected by the wind power information of the track section and the track section category, when the probability that the dedicated foreign object detection device detects the foreign object exceeds the preset probability, the determination of the distribution probability of foreign object in distribution area will be adjusted according to whether the foreign object is detected. When the probability that the dedicated foreign object detection device detects the foreign object is lower than the preset probability, the distribution probability of foreign object in the distribution area of the track section where the inspection device is located will be determined according to the query result of the correspondence between the wind power information of the track section, the track section category and the distribution probability of foreign object in distribution area.

Optionally, acquiring the correspondence between the wind power information of the track section, the track section category and a probability that the dedicated foreign object detection device detects the foreign object includes:

according to the correspondence between the historical wind power information of the track section, the track section category and a result of the foreign object detection by the inspection device, acquiring the result of the foreign object detection by the inspection device corresponding to the current wind power information of the track section and the track section category;

according to the correspondence between the historical wind power information of the track section, the track section category and a result that the dedicated foreign object detection device detects the foreign object, acquiring the result that the dedicated foreign object detection device detects the foreign object corresponding to the current wind power information of the track section and the track section category;

comparing the result that the dedicated foreign object detection device detects the foreign object and the result of the foreign object detection by the inspection device corresponding to the current wind power information of the track section and the track section category, and determining and acquiring a comparison rate as the wind power information of the track section, the track section category and the probability that the dedicated foreign object detection device detects the foreign object.

According to the above steps, by comparing the result of the foreign object detection by the inspection device corresponding to the current wind power information of the track section and the track section category to the result that the dedicated foreign object detection device detects the foreign object corresponding to the current wind power information of the track section and the track section category, the acquired probability that the dedicated foreign object detection device detects the foreign object is more accurate.

Optionally, determining the processing scheme for the foreign object with the corresponding volume as follows:

acquiring image information of the foreign object;

comparing the image information of the foreign object with a preset image information of the foreign object;

if the comparison is consistent, identifying and acquiring the volume information of the foreign object;

if the volume of the foreign object belongs to a preset volume range, activating the inspection device to actively suck the respective foreign object into a collection box, wherein the inspection device is configured to be integrated with a suction mechanism and the collection box;

if the volume of the foreign object is greater than a maximum volume in the preset volume range, marking a location of the foreign object in the travel trajectory inspected by the inspection device, and after the inspection device completes the inspection of all foreign objects, sending the summarized trajectory and marking information to a terminal held by a responsible person.

According to the above steps, it is fully considered that the inspection device will further determine whether the foreign object is a real foreign object through image recognition during the inspection process, and adopt a reasonable processing scheme based on the volume of the foreign object to maximize the treatment efficiency of the foreign object.

In a second aspect, the disclosure provides a subway tunnel intelligent monitoring system including:
an acquisition module for acquiring an inspection time plan of an inspection device;
an activate module for activating the inspection device to inspect a track section and detect a foreign object according to the inspection time plan of the inspection device;
a determination module for identifying and acquiring a volume of the foreign object when the inspection device detects the foreign object during foreign object detection, and determining the processing scheme for the foreign object with the corresponding volume according to a correspondence between a range interval to which the volume of the foreign object belongs and a processing scheme;
an execution module for executing the processing scheme for the foreign object with the corresponding volume.

According to the above system, the inspection device can be fully utilized by the acquisition module and the activate module to detect foreign objects in the process of inspection according to the inspection time plan, and targeted processing schemes are provided by the determination module and execution module for foreign objects of different volumes, so as to minimize the foreign objects present in the track and reduce safety hazards.

To sum up, the disclosure includes at least one of the following beneficial technical effects:
1. The efficiency of discovering foreign object can be improved, and the foreign object can be treated in time according to its volume, which improves the treating efficiency of foreign objects.
2. During the foreign object inspection process, foreign object areas with risks can be discovered more promptly, which reduces the potential safety hazards caused by untimely treating of foreign objects.

In the figure, 1, acquisition module; 2, activate module; 3, determination module; 4, execution module.

DETAILED DESCRIPTION

The disclosure will be further described in detail below in combination with Figure.

Figure 1:
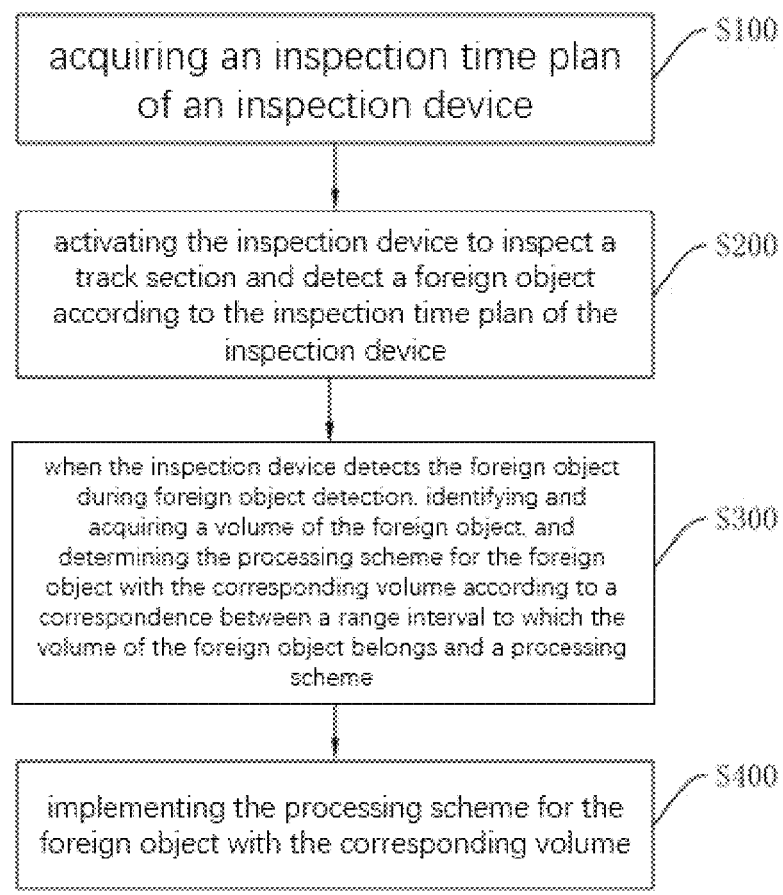
FIG. 1 is an overall schematic flow chart of a subway tunnel intelligent monitoring method of an embodiment of the disclosure.

Referring to FIG. 1, a subway tunnel intelligent monitoring method including:

Step S100, acquiring an inspection time plan of an inspection device.

In particular, the inspection device can be a track inspection vehicle or an inspection robot. Taking the inspection robot as an example, the inspection robot is provided with a detection device and a control device. The detection device can be arranged outside the robot, so as to conveniently and effectively detect the surrounding environment of the robot. The specific type of the detection device is not limited, and includes but is not limited to visual sensors, ultrasonic sensors and laser scanning ranging sensors. The above sensors can be used to detect the physical environment within a certain range around the robot to acquire corresponding data. The detection device can feed data back to the control device. The control device can further analyze and monitor the data to complete safety inspections in subway tunnels.

In particular, the inspection time plan of the inspection device can be queried and acquired from a preset database storing the inspection time planning of the inspection device, and the inspection time planning can be set to the subway shutdown period.

Step S200, activating the inspection device to inspect a track section and detect a foreign object according to the inspection time plan of the inspection device.

In particular, the foreign object can be recyclable garbage, dust, etc., or other garbage defined by the user that needs to be collected and treated. The inspection device performs foreign object detection on the track section as follows: detecting and acquiring parameters of the external object by the detection device, and determining whether the respective object is a foreign object based on the parameters of the external object.

Step S300, when the inspection device detects the foreign object during foreign object detection, identifying and acquiring a volume of the foreign object, and determining the processing scheme for the foreign object with the corresponding volume according to a correspondence between a range interval to which the volume of the foreign object belongs and a processing scheme.

In particular, the identification and acquisition of foreign object volume information can be that acquiring image information of the foreign object through a visual sensor on the detection device, and determining and acquiring the foreign object volume information based on the image information. The determination of the processing scheme for the foreign object with corresponding volume is as follows: using the volume of the foreign object as the query object, querying and acquiring the processing scheme for the foreign object with corresponding volume from a preset database storing the correspondence between the volume of foreign object and the processing scheme.

Step S400, implementing the processing scheme for the foreign object with the corresponding volume.

In step S200 of FIG. 1, it is further considered that during the process of foreign object detection by the inspection device on the track section, the foreign object can be discovered more promptly, so as to indirectly improve the efficiency of treating foreign object and the efficiency of treating safety hazards. Therefore, it is necessary to make a more accurate determination of the distribution probability of foreign object in distribution area. Specifically, it will be described in detail with reference to the embodiment shown in FIG. 2.

Figure 2:
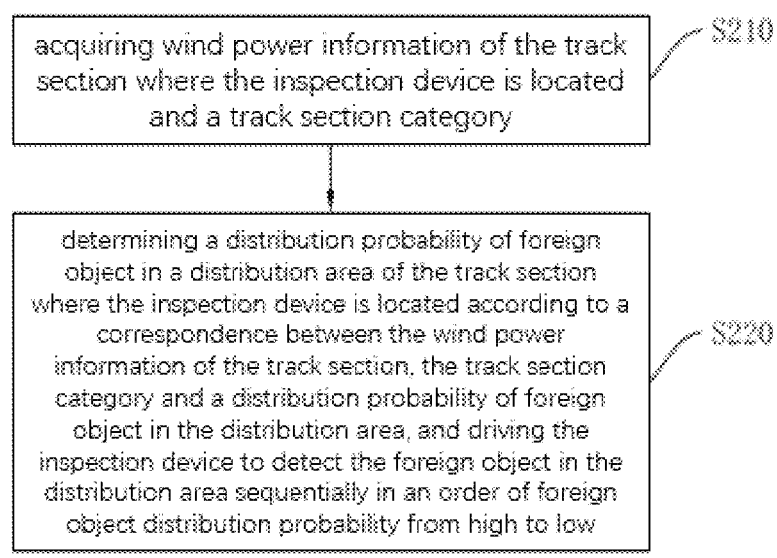
FIG. 2 is a schematic flow chart of another embodiment of the disclosure with activating the inspection device to inspect a track section and detect a foreign object.

Referring to FIG. 2, activating the inspection device to inspect a track section and detect a foreign object includes:

Step S210, acquiring wind power information of the track section where the inspection device is located and a track section category.

In particular, the wind power information of the track section where the inspection device is located can be detected and acquired by a wind power detection device arranged in advance in the track section, and the wind power information of the track section includes wind power intensity and wind direction. The track section category where the inspection device is located can be queried and confirmed from a preset database storing the correspondence between the track section category and the location, and the track section category is defined to include a tunnel section and an open-air section.

Step S220, determining a distribution probability of foreign object in a distribution area of the track section where the inspection device is located according to a correspondence between the wind power information of the track section, the track section category and a distribution probability of foreign object in the distribution area, and driving the inspection device to detect the foreign object in the distribution area sequentially in an order of foreign object distribution probability from high to low.

The distribution probability of foreign object in distribution area is determined as follows: using the wind power information of the track section and the track section category where the inspection device is located as common query objects, querying and acquiring the distribution probability of foreign object in distribution area from a preset database storing the correspondence between the wind power information of the track section, the track section category where the inspection device is located and the probability that the distribution probability of foreign object in distribution area.

Assuming that the distribution area is divided into three areas, namely area A, area B, and area C. The distribution probability in area A is 30%, the distribution probability in area B is 50%, and the distribution probability in area C is 20%. Then the inspection device will perform at first foreign object detection on area B, then on area A, and at last on area C.

In step S220 of FIG. 2, it is further considered the condition that it is impossible to directly determine the distribution probability of foreign object in the distribution area of the track section where the inspection device is located according to the correspondence between the wind power information of the track section, the track section category and the distribution probability of foreign object in distribution area. At this time, it is necessary to indirectly determine the distribution probability of foreign object in the distribution area of the track section where the inspection device is located in combination with the distribution probability of foreign object in distribution area corresponding to a plurality of wind power information with a same wind direction corresponding to the current track section category and the current wind power information and closest to a wind power intensity corresponding to the current wind power information. Specifically, it will be described in detail with reference to the embodiment shown in FIG. 3.

Figure 3:
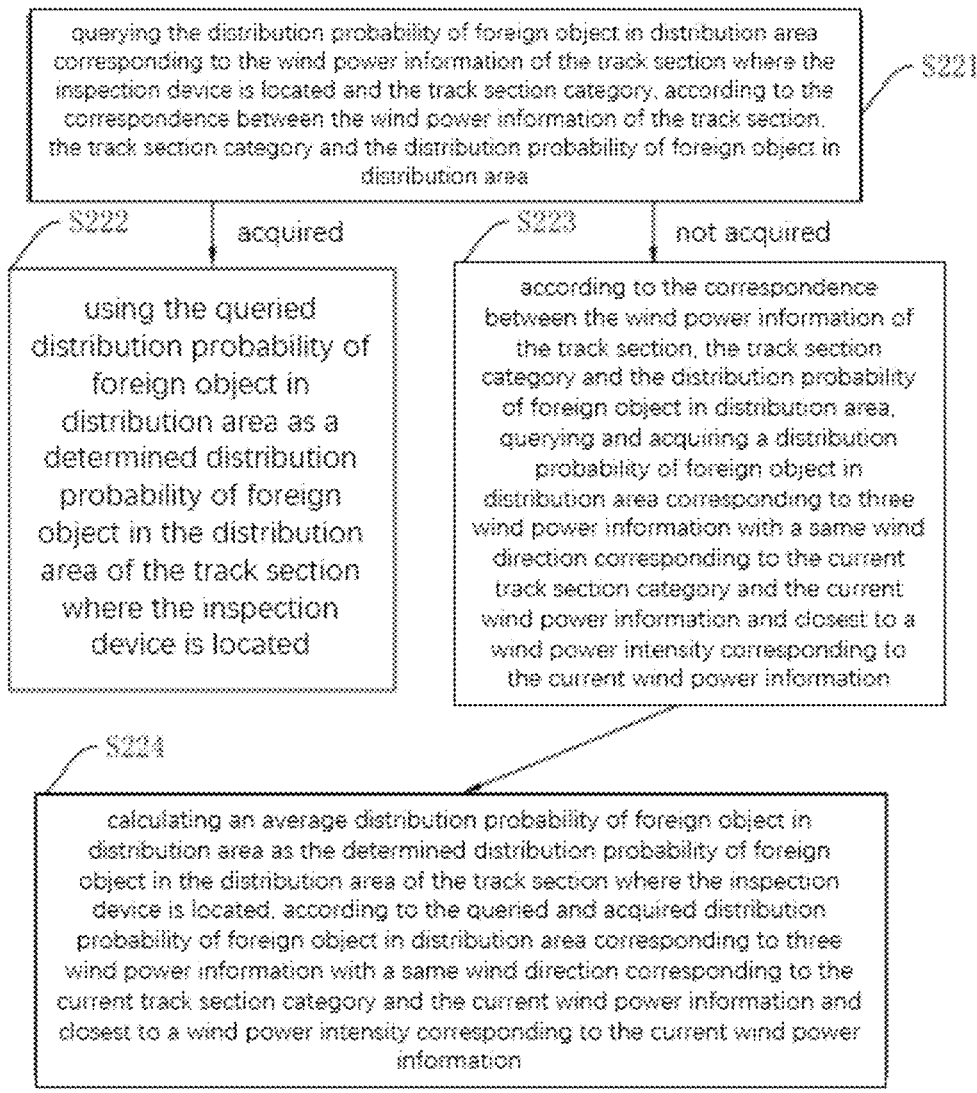
FIG. 3 is a schematic flow chart of another embodiment of the disclosure with according to the correspondence between the wind power information of the track section, the track section category and the distribution probability of foreign object in distribution area, determining the distribution probability of foreign object in the distribution area of the track section where the inspection device is located.

Referring to FIG. 3, according to the correspondence between the wind power information of the track section, the track section category and the distribution probability of foreign object in distribution area, determining the distribution probability of foreign object in the distribution area of the track section where the inspection device is located includes:

Step S221, querying the distribution probability of foreign object in distribution area corresponding to the wind power information of the track section where the inspection device is located and the track section category, according to the correspondence between the wind power information of the track section, the track section category and the distribution probability of foreign object in distribution area; if the distribution probability is acquired, execute step S222; otherwise, execute step S223.

Step S222, using the queried distribution probability of foreign object in distribution area as a determined distribution probability of foreign object in the distribution area of the track section where the inspection device is located.

Step S223, according to the correspondence between the wind power information of the track section, the track section category and the distribution probability of foreign object in distribution area, querying and acquiring a distribution probability of foreign object in distribution area corresponding to three wind power information with a same wind direction corresponding to the current track section category and the current wind power information and closest to a wind power intensity corresponding to the current wind power information.

In particular, querying and acquiring of the distribution probability of foreign object in distribution area corresponding to three wind power information with a same wind direction corresponding to the current track section category and the current wind power information and closest to a wind power intensity corresponding to the current wind power information is as follows: using the three wind power information with a same wind direction corresponding to the current track section category and the current wind power information and closest to a wind power intensity corresponding to the current wind power information as common query objects, querying and obtaining a distribution probability of foreign object in distribution area corresponding to three wind power information with a same wind direction corresponding to the current track section category and the current wind power information and closest to a wind power intensity corresponding to the current wind power information from a preset database storing the correspondence between the wind power information of the track section, the track section category and the distribution probability of foreign object in distribution area.

Step S224, calculating an average distribution probability of foreign object in distribution area as the determined distribution probability of foreign object in the distribution area of the track section where the inspection device is located, according to the queried and acquired distribution probability of foreign object in distribution area corresponding to three wind power information with a same wind direction corresponding to the current track section category and the current wind power information and closest to a wind power intensity corresponding to the current wind power information.

In particular, the average distribution probability of foreign object in distribution area is calculated as follows: after querying and acquiring the distribution probability of foreign object in distribution area corresponding to three wind power information with a same wind direction corresponding to the current track section category and the current wind power information and closest to a wind power intensity corresponding to the current wind power information, using the sum of the probabilities of foreign object in the same distribution area as the dividend and 3 as the divisor, a acquired quotient is the average distribution probability of foreign object in the corresponding distribution area, so as to acquire the average distribution probability of foreign object in distribution area in sequence.

In step S220 of FIG. 2, it is further considered that in the process of driving the inspection device to detect the foreign object in the distribution area sequentially in the order of foreign object distribution probability from high to low, there may be a situation where the distribution probabilities of the distribution areas are the same. In this case, it is necessary to further consider the risk situation of the distribution areas, so as to rank the distribution areas with the same distribution probability of foreign object. Specifically, it will be described in detail with reference to the embodiment shown in FIG. 4.

Figure 4:
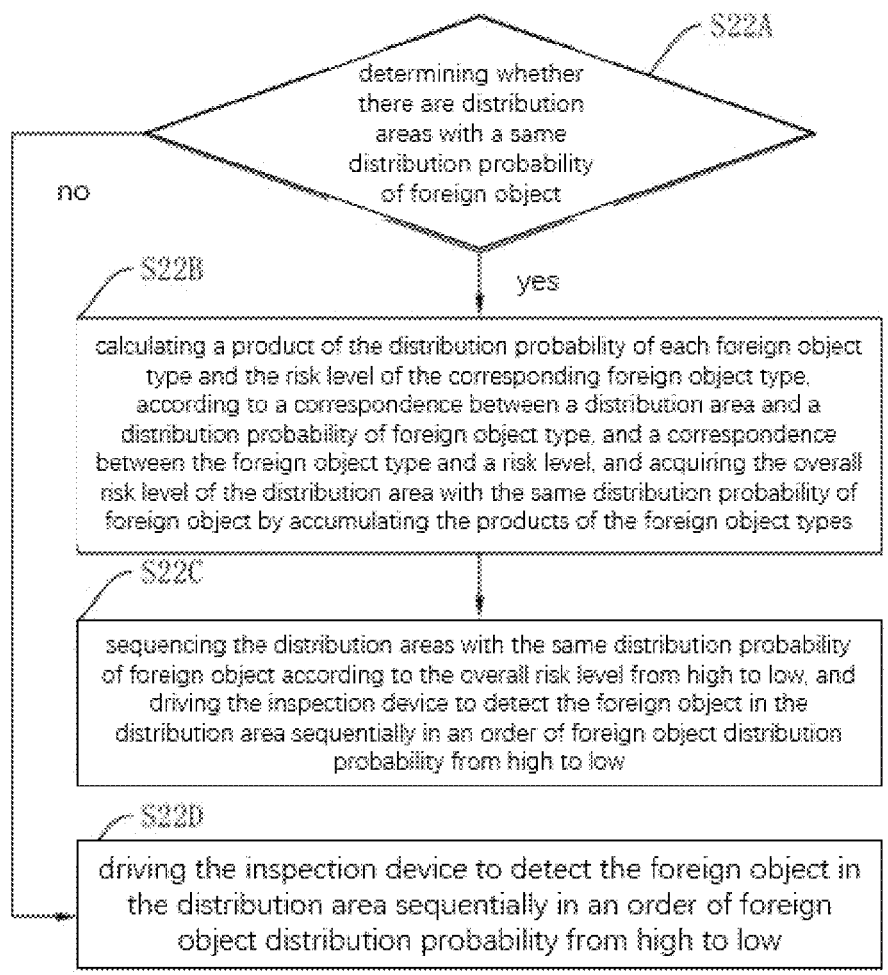
FIG. 4 is a schematic flow chart of another embodiment of the disclosure with driving the inspection device to detect the foreign object in the distribution area sequentially in an order of foreign object distribution probability from high to low.

Referring to FIG. 4, driving the inspection device to detect the foreign object in the distribution area sequentially in an order of foreign object distribution probability from high to low includes:

Step S22A, determining whether there are distribution areas with a same distribution probability of foreign object; if yes, execute step S22B; if no, execute step S22D.

In particular, the distribution areas with the same distribution probability of foreign object are determined as follows: after acquiring the distribution probability of foreign object of each distribution area, comparing the existing distribution probability of foreign object in distribution are. If the comparison is consistent, it is considered that there are distribution areas with the same distribution probability of foreign object.

Step S22B, calculating a product of the distribution probability of each foreign object type and the risk level of the corresponding foreign object type, according to a correspondence between a distribution area and a distribution probability of foreign object type, and a correspondence between the foreign object type and a risk level, and acquiring the overall risk level of the distribution area with the same distribution probability of foreign object by accumulating the products of the foreign object types.

In particular, the determining and acquisition of the overall risk level is as follows: using the distribution area as the query object, querying and acquiring the distribution probability of the foreign object type from a preset database storing the correspondence between the distribution area and the distribution probability of the foreign object type, and then using the foreign object type as the query object, querying and acquiring the risk level of the foreign object type from a preset database storing the correspondence between the foreign object type and the risk level, and multiplying the risk level of the foreign object type with the corresponding distribution probability of foreign object type. The acquired product is the risk level of each foreign object type, summating the risk level of each foreign object type, and the acquired sum is the overall risk level of the respective distribution area.

The correspondence between the foreign object type and the risk level is as follows: the foreign object types can be divided into flammable and explosive objects, objects that may interfere with subway operations, and objects with no impact. The risk level of the flammable and explosive objects can be 3, the risk level of the objects that may interfere with subway operations can be 2, and the risk level of the objects with no impact can be 1.

Step S22C, sequencing the distribution areas with the same distribution probability of foreign object according to the overall risk level from high to low, and driving the inspection device to detect the foreign object in the distribution area sequentially in an order of foreign object distribution probability from high to low.

Step S22D, driving the inspection device to detect the foreign object in the distribution area sequentially in an order of foreign object distribution probability from high to low.

In step S220 of FIG. 2, it is further considered that when a dedicated foreign object detection device is provided in the track section where the inspection device is located, the distribution probability of foreign object can be determined preferentially by the dedicated foreign object detection device, so as to effectively improve the determination of the distribution probability of foreign object. Specifically, it will be described in detail with reference to the embodiment shown in FIG. 5.

Figure 5:
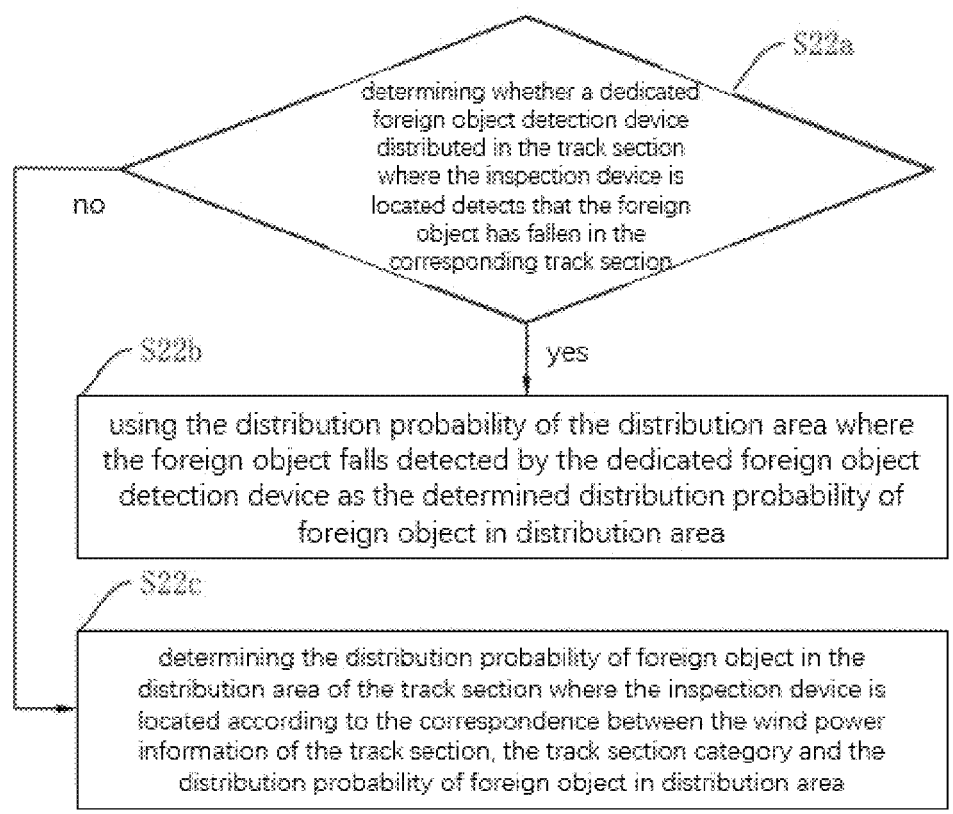
FIG. 5 is a schematic flow chart of another embodiment of the disclosure with according to the correspondence between the wind power information of the track section, the track section category and the distribution probability of foreign object in distribution area, determining the distribution probability of foreign object in the distribution area of the track section where the inspection device is located.

Referring to FIG. 5, according to the correspondence between the wind power information of the track section, the track section category and the distribution probability of foreign object in distribution area, determining the distribution probability of foreign object in the distribution area of the track section where the inspection device is located includes:

Step S22a, determining whether a dedicated foreign object detection device distributed in the track section where the inspection device is located detects that the foreign object has fallen in the corresponding track section. If yes, execute step S22b; if no, execute step S22c.

In particular, the dedicated foreign object detection device distributed in the track section where the inspection device is located can be a camera device. The dedicated foreign object detection device detects foreign objects falling on the respective track section as follows: capturing and acquiring an image of the track section, and determining whether there are foreign objects based on image recognition. If there are foreign objects, it is determined that the foreign objects have fallen on the respective track section.

Step S22b, using the distribution probability of the distribution area where the foreign object falls detected by the dedicated foreign object detection device as the determined distribution probability of foreign object in distribution area.

In particular, the acquisition of the distribution probability of the distribution area where foreign objects fall detected by the dedicated foreign object detection device is as follows: detecting the number of foreign objects in each distribution area by the dedicated foreign object detection device, using the total number of foreign objects in each distribution area as a dividend sequentially, and the total number of foreign objects in all distribution areas as the divisor, and the quotient acquired is the distribution probability of foreign object in each distribution area.

Step S22c, determining the distribution probability of foreign object in the distribution area of the track section where the inspection device is located according to the correspondence between the wind power information of the track section, the track section category and the distribution probability of foreign object in distribution area.

In step S22a of FIG. 5, it is further considered that under the condition that the dedicated foreign object detection device detects foreign objects, the subway tunnel can be detected on-site through the dedicated foreign object detection device. The specific detection contents include block falling, water seepage, and abnormal status of basic equipment and facilities in the tunnel.

In particular, the detection of block falling can be carried out by using a dedicated foreign object detection device to acquire whether there is block falling at the position where block falling is easy to occur, and judging whether block falling occurs. The detection of water seepage can also be carried out by using a foreign object detection device to acquire the water seepage image at the position where water seepage is easy to occur. The location where water seepage occurs is the annular seam, longitudinal seam and interval communication channel. The detection of abnormal status of basic equipment and facilities in the tunnel can be carried out by using a dedicated foreign object detection device to acquire the actual working data displayed on the respective basic equipment and facilities in the tunnel, and then comparing it with the preset working data to determine whether the status of the basic equipment and facilities in the tunnel is abnormal.

In step S22c of FIG. 5, it is further considered that when foreign objects are blown into a detection blind spot of the dedicated foreign object detection device due to the wind power in the track section where the dedicated foreign object detection device is located, or when the dedicated foreign object detection device is unable to rotate for detection due to the wind power, it is necessary to further determine the distribution probability of foreign object in the distribution area of the track section where the inspection device is located. Specifically, it will be described in detail with reference to the embodiment shown in FIG. 6.

Figure 6:
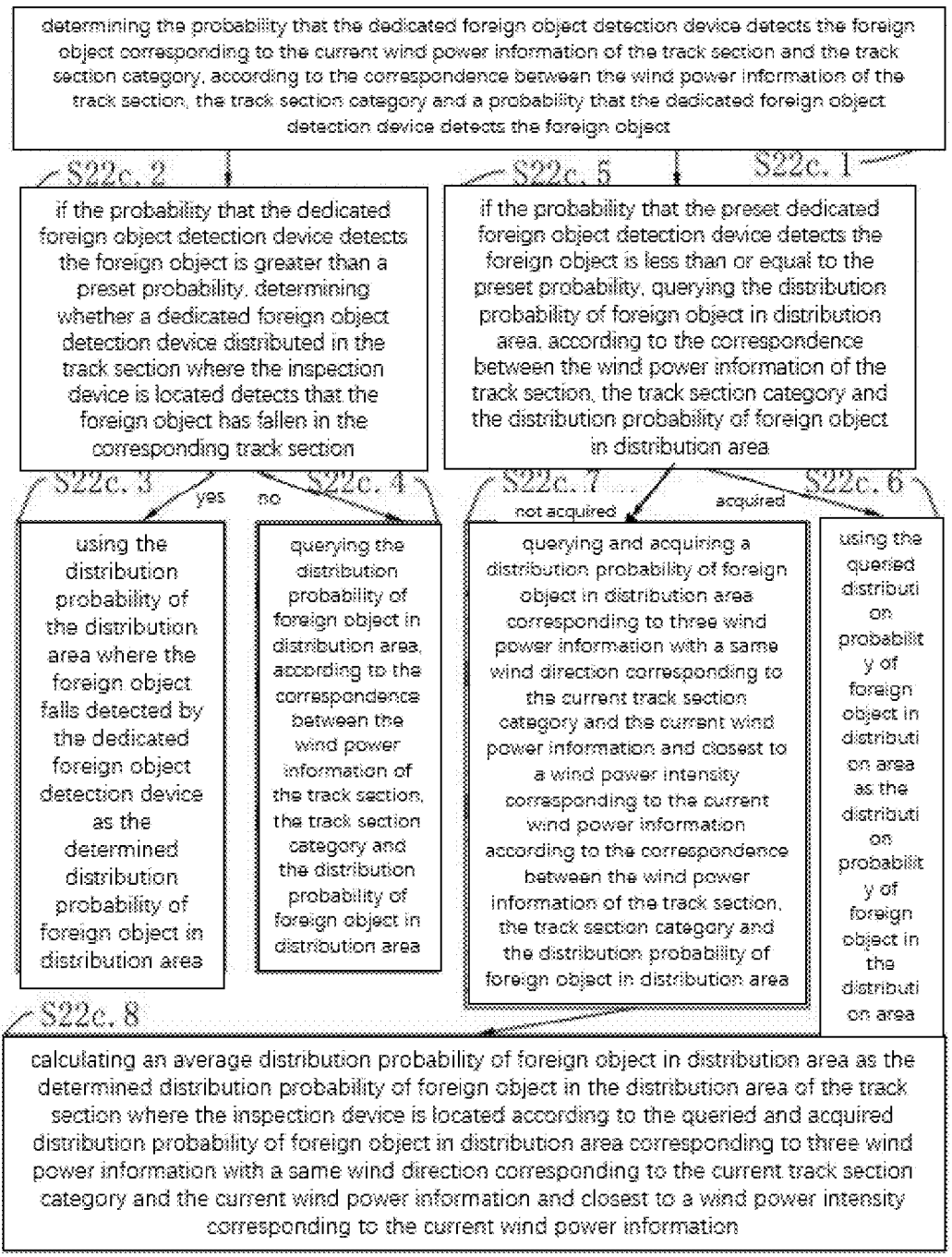
FIG. 6 is a specific schematic flow chart of step S22c in FIG. 5.

Referring to FIG. 6, according to the correspondence between the wind power information of the track section, the track section category and the distribution probability of foreign object in distribution area, determining the distribution probability of foreign object in the distribution area of the track section where the inspection device is located includes:

Step S22c.1, determining the probability that the dedicated foreign object detection device detects the foreign object corresponding to the current wind power information of the track section and the track section category, according to the correspondence between the wind power information of the track section, the track section category and a probability that the dedicated foreign object detection device detects the foreign object.

In particular, the probability that the dedicated foreign object detection device detects the foreign object corresponding to the current wind power information of the track section and the track section category is determined as follows: using the wind power information of the track section and the track section category as common query objects, querying and acquiring the probability that the dedicated foreign object detection device detects the foreign object from a preset database storing the correspondence between the wind power information of the track section, the track section category and the probability that the dedicated foreign object detection device detects the foreign object.

Step S22c.2, if the probability that the dedicated foreign object detection device detects the foreign object is greater than a preset probability, determining whether a dedicated foreign object detection device distributed in the track section where the inspection device is located detects that the foreign object has fallen in the corresponding track section. If yes, execute step S22c.3; if no, execute step S22c.4.

In particular, the preset probability can be 60% or 50%. The specific settings can be adjusted according to the needs.

Step S22c.3, using the distribution probability of the distribution area where the foreign object falls detected by the dedicated foreign object detection device as the determined distribution probability of foreign object in distribution area.

Step S22c.4, querying the distribution probability of foreign object in distribution area, according to the correspondence between the wind power information of the track section, the track section category and the distribution probability of foreign object in distribution area.

Step S22c.5, if the probability that the preset dedicated foreign object detection device detects the foreign object is less than or equal to the preset probability, querying the distribution probability of foreign object in distribution area, according to the correspondence between the wind power information of the track section, the track section category and the distribution probability of foreign object in distribution area. If a result is found, execute step S22c.6; otherwise, execute step S22c.7.

Step S22c.6, using the queried distribution probability of foreign object in distribution area as the distribution probability of foreign object in the distribution area.

Specifically, the setting of step S22c.6 is the same as the description of step S222, which will not be repeated here.

Step S22c.7, querying and acquiring a distribution probability of foreign object in distribution area corresponding to three wind power information with a same wind direction corresponding to the current track section category and the current wind power information and closest to a wind power intensity corresponding to the current wind power information according to the correspondence between the wind power information of the track section, the track section category and the distribution probability of foreign object in distribution area.

Specifically, the setting of step S22c.7 is the same as the description of step S223, which will not be repeated here.

Step S22c.8, calculating an average distribution probability of foreign object in distribution area as the determined distribution probability of foreign object in the distribution area of the track section where the inspection device is located according to the queried and acquired distribution probability of foreign object in distribution area corresponding to three wind power information with a same wind direction corresponding to the current track section category and the current wind power information and closest to a wind power intensity corresponding to the current wind power information.

Specifically, the setting of step S22c.8 is the same as the description of step S224, which will not be repeated here.

In step S22c.1 of FIG. 6, regarding the probability that the dedicated foreign object detection device detects the foreign object, it is necessary to reconfirm the probability that the dedicated foreign object detection device detects the foreign object by comparing the inspection results of the historical inspection device with the result that the dedicated foreign object detection device detects the foreign object. Specifically, it will be described in detail with reference to the embodiment shown in FIG. 7.

Figure 7:
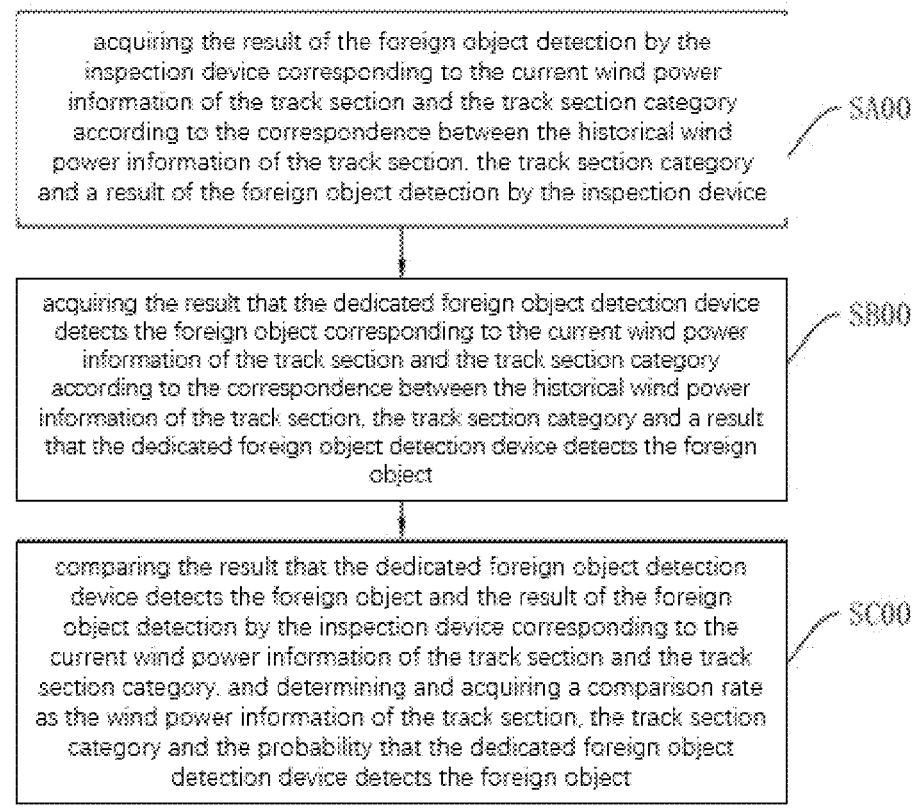
FIG. 7 is a schematic flow chart of another embodiment of the disclosure with acquiring the correspondence between the wind power information of the track section, the track section category and a probability that the dedicated foreign object detection device detects the foreign object.

Referring to FIG. 7, acquiring the correspondence between the wind power information of the track section, the track section category and a probability that the dedicated foreign object detection device detects the foreign object includes:

Step SA00, acquiring the result of the foreign object detection by the inspection device corresponding to the current wind power information of the track section and the track section category according to the correspondence between the historical wind power information of the track section, the track section category and a result of the foreign object detection by the inspection device.

Step SB00, acquiring the result that the dedicated foreign object detection device detects the foreign object corresponding to the current wind power information of the track section and the track section category according to the correspondence between the historical wind power information of the track section, the track section category and a result that the dedicated foreign object detection device detects the foreign object.

Step SC00, comparing the result that the dedicated foreign object detection device detects the foreign object and the result of the foreign object detection by the inspection device corresponding to the current wind power information of the track section and the track section category, and determining and acquiring a comparison rate as the wind power information of the track section, the track section category and the probability that the dedicated foreign object detection device detects the foreign object.

In step S300 of FIG. 1, it is necessary to sufficiently consider that the volumes of foreign objects are different and the treating manners are different. Specifically, it will be described in detail with reference to the embodiment shown in FIG. 8.

Figure 8:
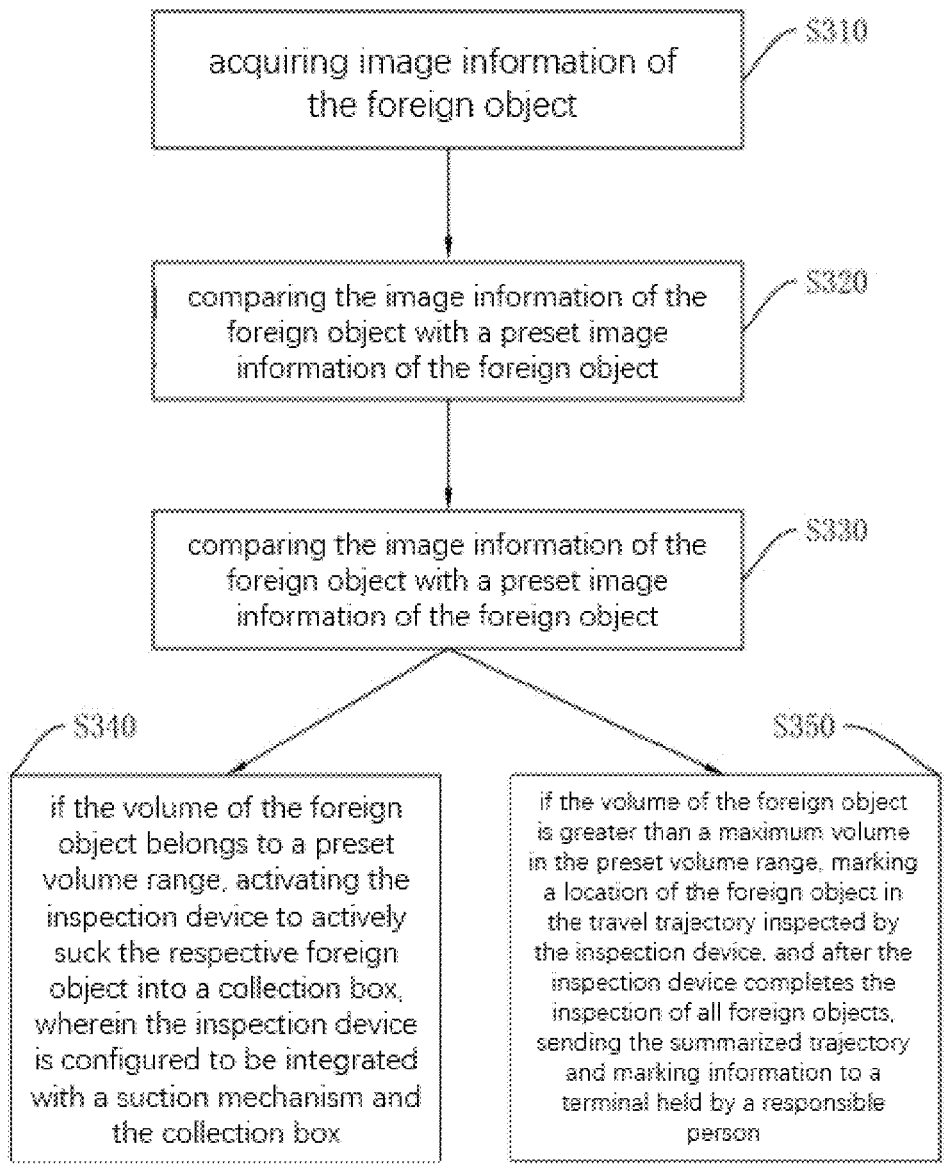
FIG. 8 is a schematic flow chart of another embodiment of the disclosure with the processing scheme for the foreign object with the corresponding volume.

Referring to FIG. 8, determining the processing scheme for the foreign object with the corresponding volume includes:

Step S310, acquiring image information of the foreign object.

Step S320, comparing the image information of the foreign object with a preset image information of the foreign object.

In particular, the foreign objects include laptop bags, men's and women's backpacks, handbags, paper handbags, plastic bags filled with items, express packaging bags, water cups, medicine bottles, mineral water bottles, cartridge-shaped cylinders, etc. These pictures will be used as training data set.

Step S330, if the comparison is consistent, identifying and acquiring the volume of the foreign object.

In particular, the identification and acquisition of foreign object volume can be that acquiring image information of the foreign object through a visual sensor on the detection device, and determining and acquiring the foreign object volume information based on the image information.

Step S340, if the volume of the foreign object belongs to a preset volume range, activating the inspection device to actively suck the respective foreign object into a collection box, wherein the inspection device is configured to be integrated with a suction mechanism and the collection box.

Step S350, if the volume of the foreign object is greater than a maximum volume in the preset volume range, marking a location of the foreign object in the travel trajectory inspected by the inspection device, and after the inspection device completes the inspection of all foreign objects, sending the summarized trajectory and marking information to a terminal held by a responsible person.

In particular, the terminal held by a responsible person can be a mobile phone, a computer or other terminal devices.

In step S340 of FIG. 8, it is further considered that in the process of the inspection device actively sucking the respective foreign object into the collection box, it is also necessary to consider whether there is enough space to collect the foreign object. Specifically, it will be described in detail with reference to the embodiment shown in FIG. 9.

Figure 9:
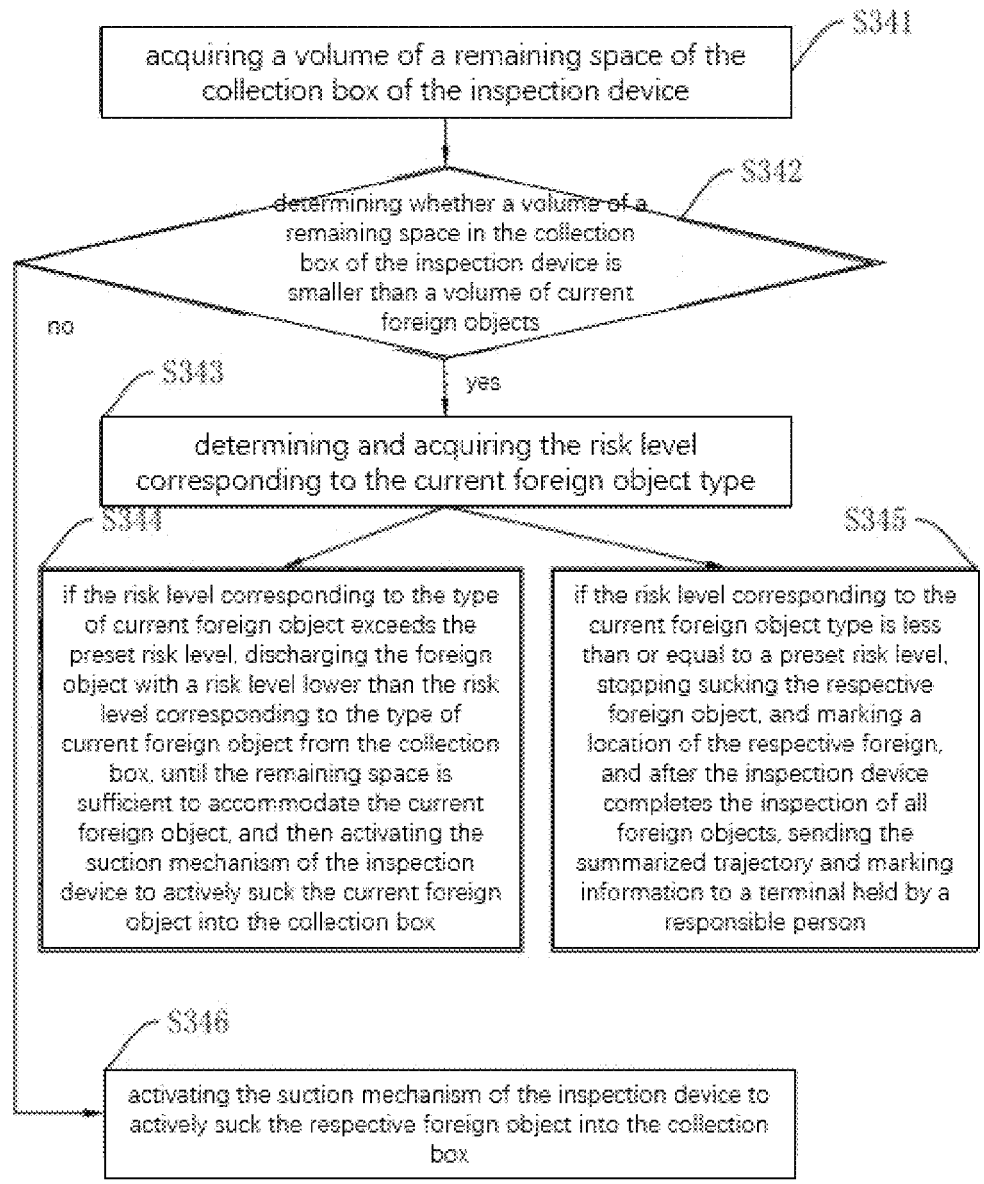
FIG. 9 is a schematic flow chart of another embodiment of the disclosure with if the volume of the foreign object belongs to a preset volume range, activating the inspection device to actively suck the respective foreign object into a collection box.

Referring to FIG. 9, if the volume of the foreign object belongs to a preset volume range, activating the inspection device to actively suck the respective foreign object into a collection box includes:

Step S341, acquiring a volume of a remaining space of the collection box of the inspection device.

In particular, the volume of the remaining space of the collection box of the inspection device is acquired as follows: acquiring the space that does not contain foreign object by capturing the interior through a capture device arranged in advance in the inspection device, and calculating, determining and acquiring the volume of the remaining space of the collection box.

Step S342, determining whether a volume of a remaining space in the collection box of the inspection device is smaller than a volume of current foreign objects. If yes, execute step S343; if no, execute step S346.

Step S343, determining and acquiring the risk level corresponding to the current foreign object type.

In particular, the determining and acquisition of the risk level corresponding to the type of current foreign object is as follows: using the type of current foreign object as the query object, querying and acquiring the risk level corresponding to the type of current foreign object from a preset database storing the correspondence between the foreign object type and the risk level.

Step S344, if the risk level corresponding to the type of current foreign object exceeds the preset risk level, discharging the foreign object with a risk level lower than the risk level corresponding to the type of current foreign object from the collection box, until the remaining space is sufficient to accommodate the current foreign object, and then activating the suction mechanism of the inspection device to actively suck the current foreign object into the collection box.

Step S345, if the risk level corresponding to the current foreign object type is less than or equal to a preset risk level, stopping sucking the respective foreign object, and marking a location of the respective foreign, and after the inspection device completes the inspection of all foreign objects, sending the summarized trajectory and marking information to a terminal held by a responsible person.

Step S346, activating the suction mechanism of the inspection device to actively suck the respective foreign object into the collection box.

Figure 10:
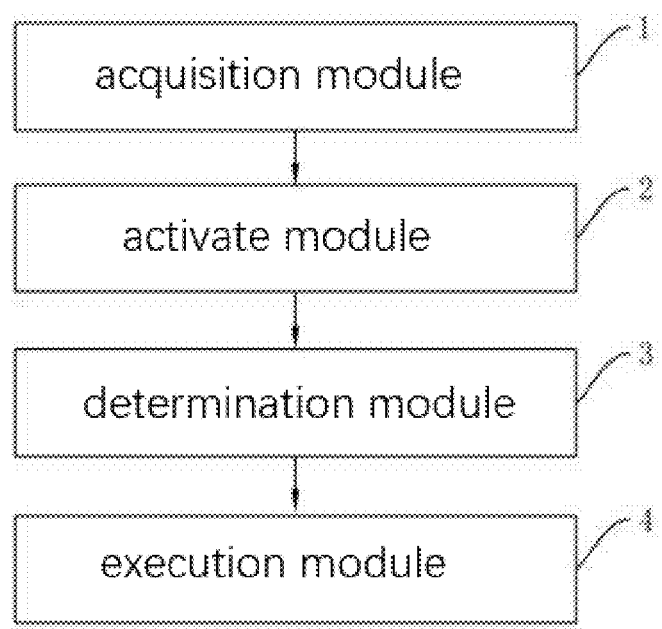
FIG. 10 is a system block diagram of the subway tunnel intelligent monitoring system according to the embodiment of the disclosure.

Referring to FIG. 10, the embodiment of the disclosure also provides a subway tunnel intelligent monitoring system including:

an acquisition module 1 for acquiring an inspection time plan of an inspection device;

an activate module 2 for activating the inspection device to inspect a track section and detect a foreign object according to the inspection time plan of the inspection device;

a determination module 3 for identifying and acquiring a volume of the foreign object when the inspection device detects the foreign object during foreign object detection, and determining the processing scheme for the foreign object with the corresponding volume according to a correspondence between a range interval to which the volume of the foreign object belongs and a processing scheme;

an execution module 4 for executing the processing scheme for the foreign object with the corresponding volume.

The embodiments above are all preferred embodiments of the disclosure, and do not limit the scope of protection of the application. Therefore, any equivalent changes made based on the structure, shape, and principle of the application shall be covered by the protection scope of the application.

What is claimed is:

1. A subway tunnel intelligent monitoring method, comprising:

acquiring an inspection time plan of an inspection device;

activating the inspection device to inspect a track section and detect a foreign object according to the inspection time plan of the inspection device;

when the inspection device detects a foreign object during detecting of a foreign object, identifying and acquiring a volume of the foreign object, and according to a correspondence between a range interval to which the volume of the foreign object belongs and a processing scheme, determining a processing scheme for the foreign object with a corresponding volume; and implementing the processing scheme for the foreign object with the corresponding volume;

wherein activating the inspection device to inspect a track section and detect a foreign object comprises:

acquiring wind power information of the track section where the inspection device is located and a track section category, and defining the track section category into a tunnel section and an open-air section; and determining a distribution probability of foreign object in a distribution area of the track section where the inspection device is located according to a correspondence between the wind power information of the track section, the track section category and a distribution probability of foreign object in the distribution area, and driving the inspection device to detect the foreign object in the distribution area sequentially in an order of foreign object distribution probability from high to low.

2. The subway tunnel intelligent monitoring method according to claim 1, wherein determining a distribution probability of foreign object in a distribution area of the track section where the inspection device is located according to a correspondence between the wind power information of the track section, the track section category and a distribution probability of foreign object in the distribution area comprises:

querying the distribution probability of foreign object in distribution area corresponding to the wind power information of the track section where the inspection device is located and the track section category according to a correspondence between the wind power information of the track section, the track section category and a distribution probability of foreign object in the distribution area;

if the distribution probability is acquired, using the queried distribution probability of foreign object in distribution area as an determined distribution probability of foreign object in the distribution area of the track section where the inspection device is located;

if no distribution probability is acquired, querying and acquiring a distribution probability of foreign object in distribution area corresponding to three wind power information with a same wind direction corresponding to the current track section category and the current wind power information and closest to a wind power intensity corresponding to the current wind power information according to a correspondence between the wind power information of the track section, the track section category and a distribution probability of foreign object in the distribution area;

according to the queried and acquired distribution probability of foreign object in distribution area corresponding to three wind power information with a same wind direction corresponding to the current track section category and the current wind power information and closest to a wind power intensity corresponding to the current wind power information, calculating an average distribution probability of foreign object in the distribution area as the determined distribution probability of foreign object in the distribution area of the track section where the inspection device is located.

3. The subway tunnel intelligent monitoring method according to claim 2, wherein driving the inspection device to detect the foreign object in the distribution area sequentially in an order of foreign object distribution probability from high to low comprises:

determining whether there are distribution areas with a same distribution probability of foreign object;

if yes, calculating a product of the distribution probability of each of foreign object types and the risk level of the corresponding foreign object type according to a correspondence between a distribution area and a distribution probability of foreign object type, and a correspondence between the foreign object type and a risk level, and acquiring an overall risk level of the distribution area with the same distribution probability of foreign object by accumulating the products of the foreign object types;

sequencing the distribution areas with the same distribution probability of foreign object according to the overall risk level from high to low, and driving the inspection device to detect the foreign object in the distribution area sequentially in an order of foreign object distribution probability from high to low;

if no, driving the inspection device to detect the foreign object in the distribution area sequentially in an order of foreign object distribution probability from high to low.

4. The subway tunnel intelligent monitoring method according to claim 1, wherein determining a distribution probability of foreign object in a distribution area of the track section where the inspection device is located according to a correspondence between the wind power information of the track section, the track section category and a distribution probability of foreign object in the distribution area comprises:

determining whether a dedicated foreign object detection device distributed in the track section where the inspection device is located detects that the foreign object falls in the corresponding track section;

if the dedicated foreign object detection device distributed in the track section where the inspection device is located detects that the foreign object falls in the corresponding track section, using the distribution probability of the distribution area where the foreign object falls detected by the dedicated foreign object detection device as the determined distribution probability of foreign object in distribution area;

if the dedicated foreign object detection device distributed in the track section where the inspection device is located does not detect that the foreign object falls in the corresponding track section, determining the distribution probability of foreign object in the distribution area of the track section where the inspection device is located, according to the correspondence between the wind power information of the track section, the track section category and the distribution probability of foreign object in distribution area.

5. The subway tunnel intelligent monitoring method according to claim 4, wherein further comprising:

activating the dedicated foreign object detection device for on-site inspection of subway tunnel, wherein the inspection content comprises block falling, water seepage, and abnormal status of basic equipment and facilities in the tunnel, and the step of activating the dedicated foreign object detection device for on-site inspection of subway tunnel is performed in parallel to the step of determining whether a dedicated foreign object detection device distributed in the track section where the inspection device is located detects that the foreign object falls in the corresponding track section.

6. The subway tunnel intelligent monitoring method according to claim 4, wherein, if the dedicated foreign object detection device distributed in the track section where the inspection device is located does not detect that the foreign object falls in the corresponding track section, determining the distribution probability of foreign object in the distribution area of the track section where the inspection device is located, according to the correspondence between the wind power information of the track section, the track section category and the distribution probability of foreign object in distribution area comprises:

determining the probability that the dedicated foreign object detection device detects the foreign object corresponding to the current wind power information of the track section and the track section category according to the correspondence between the wind power information of the track section, the track section category and a probability that the dedicated foreign object detection device detects the foreign object;

if the probability that the dedicated foreign object detection device detects the foreign object is greater than a preset probability, determining whether a dedicated foreign object detection device distributed in the track section where the inspection device is located detects that the foreign object has fallen in the corresponding track section;

if the dedicated foreign object detection device distributed in the track section where the inspection device is located detects that the foreign object has fallen in the corresponding track section, using the distribution probability of the distribution area where the foreign object falls detected by the dedicated foreign object detection device as the determined distribution probability of foreign object in distribution area;

if the dedicated foreign object detection device distributed in the track section where the inspection device is located does not detect that the foreign object has fallen in the corresponding track section, according to the correspondence between the wind power information of the track section, the track section category and the distribution probability of foreign object in distribution area, querying the distribution probability of foreign object in distribution area;

if the probability that the preset dedicated foreign object detection device detects the foreign object is less than or equal to the preset probability, querying the distribution probability of foreign object in distribution area according to the correspondence between the wind power information of the track section, the track section category and the distribution probability of foreign object in distribution area;

if the distribution probability is acquired, using the queried distribution probability of foreign object in distribution area as a determined distribution probability of foreign object in the distribution area of the track section where the inspection device is located;

if no distribution probability is acquired, querying and acquiring a distribution probability of foreign object in distribution area corresponding to three wind power information with a same wind direction corresponding to the current track section category and the current wind power information and closest to a wind power intensity corresponding to the current wind power information according to the correspondence between the wind power information of the track section, the track section category and the distribution probability of foreign object in distribution area;

calculating an average distribution probability of foreign object in distribution area as the determined distribution probability of foreign object in the distribution area of the track section where the inspection device is located, according to the queried and acquired distribution probability of foreign object in distribution area corresponding to three wind power information with a same wind direction corresponding to the current track section category and the current wind power information and closest to a wind power intensity corresponding to the current wind power information.

7. The subway tunnel intelligent monitoring method according to claim 6, wherein acquiring the correspondence between the wind power information of the track section, the track section category and a probability that the dedicated foreign object detection device detects the foreign object comprises:

acquiring the result of the foreign object detection by the inspection device corresponding to the current wind power information of the track section and the track section category according to the correspondence between the historical wind power information of the track section, the track section category and a result of the foreign object detection by the inspection device;

acquiring the result that the dedicated foreign object detection device detects the foreign object corresponding to the current wind power information of the track section and the track section category according to the correspondence between the historical wind power information of the track section, the track section category and a result that the dedicated foreign object detection device detects the foreign object;

comparing the result that the dedicated foreign object detection device detects the foreign object and the result of the foreign object detection by the inspection device corresponding to the current wind power information of the track section and the track section category, and determining and acquiring a comparison rate as the wind power information of the track section, the track section category and the probability that the dedicated foreign object detection device detects the foreign object.

8. The subway tunnel intelligent monitoring method according to claim 1, wherein determining the processing scheme for the foreign object with the corresponding volume comprises:

acquiring image information of the foreign object;

comparing the image information of the foreign object with a preset image information of the foreign object;

if the comparison is consistent, identifying and acquiring the volume information of the foreign object;

if the volume of the foreign object belongs to a preset volume range, activating the inspection device to actively suck the respective foreign object into a collection box, wherein the inspection device is configured to be integrated with a suction mechanism and the collection box;

if the volume of the foreign object is greater than a maximum volume in the preset volume range, marking a location of the foreign object in the travel trajectory inspected by the inspection device, and after the inspection device completes the inspection of all foreign objects, sending the summarized trajectory and marking information to a terminal held by a responsible person.

9. A subway tunnel intelligent monitoring system, comprising:

an acquisition module for acquiring an inspection time plan of an inspection device;

an activate module for activating the inspection device to inspect a track section and detect a foreign object according to the inspection time plan of the inspection device;

wherein the activate module is further configured for:

acquiring a wind power information of the track section where the inspection device is located and a track section category, and defining the track section category into a tunnel section and an open-air section;

determining the distribution probability of foreign object in the distribution area of the track section where the inspection device is located according to a correspondence between the wind power information of the track section, the track section category and a distribution probability of foreign object in distribution area, and driving the inspection device to detect the foreign object in the distribution area sequentially in an order of foreign object distribution probability from high to low;

wherein the subway tunnel intelligent monitoring system further comprises:

a determination module for identifying and acquiring a volume of the foreign object when the inspection device detects the foreign object during foreign object detection, and determining the processing scheme for the foreign object with the corresponding volume according to a correspondence between a range interval to which the volume of the foreign object belongs and a processing scheme;

an execution module for executing the processing scheme for the foreign object with the corresponding volume.

\* \* \* \* \*